(12) United States Patent
Boersma et al.

(10) Patent No.: US 9,753,690 B2
(45) Date of Patent: *Sep. 5, 2017

(54) SPLITABLE AND SCALABLE NORMALIZER FOR VECTOR DATA

(71) Applicant: International Business Machines Corporation, Armonk, NY (US)

(72) Inventors: Maarten J. Boersma, Holzgerlingen (DE); Markus Kaltenbach, Holzgerlingen (DE); Christophe J. Layer, Grenoble (FR); Silvia M. Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,062

(22) Filed: May 10, 2016

(65) Prior Publication Data
US 2016/0253152 A1 Sep. 1, 2016

Related U.S. Application Data

(63) Continuation of application No. 14/150,925, filed on Jan. 9, 2014, now Pat. No. 9,361,268, which is a
(Continued)

(51) Int. Cl.
*G06F 7/00* (2006.01)
*G06F 7/499* (2006.01)
(Continued)

(52) U.S. Cl.
CPC ............ *G06F 7/49936* (2013.01); *G06F 7/00* (2013.01); *G06F 7/483* (2013.01);
(Continued)

(58) Field of Classification Search
None
See application file for complete search history.

(56) References Cited

U.S. PATENT DOCUMENTS 5,790,445 A 8/1998 Eisen
6,018,798 A 1/2000 Witt et al.
(Continued)

OTHER PUBLICATIONS

Boersma, et al., U.S. Pat. No. 9,122,517, issued: Sep. 1, 2015—This Refernce is Not Provided Because it is Readily Available to the Examiner.
(Continued)

*Primary Examiner* — Michael D Yaary
(74) *Attorney, Agent, or Firm* — Maeve Carpenter (57) ABSTRACT

A tool for supporting vector operations in a scalar data path. The tool determines a location for a split in the scalar mode configuration to enable vector mode operations. The tool determines the number of coarse shift multiplexers in conflict at a bit position receiving data from both the left half and the right half of the vector mode configuration. The tool duplicates a coarse shift multiplexer in conflict at the bit position receiving data from both the left half and the right half of the vector mode configuration. The tool duplicates an intermediate data signal in conflict at a signal position receiving data from both the left half and the right half of the vector mode configuration. The tool receives a control signal to split the scalar mode configuration and shift the leading zeros across the left half and the right half of the vector mode configuration.

8 Claims, 5 Drawing Sheets

Related U.S. Application Data continuation of application No. 14/016,607, filed on Sep. 3, 2013, now Pat. No. 9,361,267.

(51) Int. Cl.
*G06F 15/78* (2006.01)
*G06F 15/80* (2006.01)
*G06F 9/30* (2006.01)
*G06F 7/483* (2006.01)

(52) U.S. Cl.
CPC ...... *G06F 7/49915* (2013.01); *G06F 9/30036* (2013.01); *G06F 15/78* (2013.01); *G06F 15/8053* (2013.01); *G06F 2207/382* (2013.01)

(56) References Cited

U.S. PATENT DOCUMENTS

| | | |
|---|---|---|
| 6,243,732 B1 | 6/2001 | Arakawa et al. |
| 7,546,443 B2 | 6/2009 | Van Hook et al. |
| 8,326,904 B2 | 12/2012 | Muff et al. |
| 8,332,452 B2 | 12/2012 | Mejdrich et al. |
| 2012/0072703 A1 | 3/2012 | Srinivasan |
| 2012/0215823 A1 | 8/2012 | Lutz |
| 2013/0036296 A1 | 2/2013 | Hickey et al. |

OTHER PUBLICATIONS

Huang, et al., "A New Architecture for Multiple-Precision Floating-Point Multiply-Add Fused Unit Design", 18th IEEE Symposium on Computer Arithmetic (ARITH'07), © 2007 IEEE.

Schwarz, Eric M., "Binary Floating-Point Unit Design: The fused multiply-add dataflow", Chapter 8 in High-Performance Energy-Efficient Microprocessor Design, pp. 189-208, Vojin G. Oklobdzija and Ram K. Krishnamurthy (eds.), © 2006 Springer, Printed in the Netherlands.

Trong, et al., "P6 Binary Floating-Point Unit", 18th IEEE Symposium on Computer Arithmetic (ARITH'07), pp. 77-86, © 2007 IEEE.

U.S. Appl. No. 14/016,607, filed Sep. 3, 2013—This Refernce is Not Provided Because it is Readily Available to the Examiner.

U.S. Appl. No. 14/150,925, filed Jan. 9, 2014—This Refernce is Not Provided Because it is Readily Available to the Examiner.

SPLITABLE AND SCALABLE NORMALIZER FOR VECTOR DATA

FIELD OF THE INVENTION

The present invention relates generally to the field of arithmetic operations, and more particularly to normalization of data in data processing units.

BACKGROUND OF THE INVENTION

In digital processing systems, numerical data is typically expressed using integer or floating-point representation. Floating-point representation is preferred in many applications because of its ability to express a wide range of values and its ease of manipulation for some specified operations. A floating-point representation includes a mantissa (or significand), an exponent, and a sign component. The mantissa represents the integer portion before the binary (or decimal) point, as well as the fractional portion after the binary point. In normalized form, the mantissa ranges from "1" to less than the value of the "base", which is two for binary but ten for decimal (i.e., 1.0≤mantissa<2.0 for normalized binary numbers). A special representation is typically used to denote 0.0. The exponent represents a scaling factor that is multiplied with the mantissa to arrive at the number being represented. The exponent is typically expressed as a power of the "base" (two for binary numbers). Finally, the sign component expresses the sign of the number, i.e., whether the number is positive or negative.

The Institute of Electrical and Electronic Engineers (IEEE) standard for floating-point arithmetic defines specific formats for representing floating-point numbers. According to the IEEE standard, a floating-point number includes a sign bit, an exponent, and a fraction. The IEEE standard has become the universal format in all microprocessor designs. The standard defines two basic formats: single precision (32 bits) and double precision (64 bits), and also provides extended formats.

Modern computer processors typically include a floating-point unit to perform mathematical operations on floating-point numbers according to the IEEE standard. In most floating-point processors, and as defined by the IEEE standard, fused multiply-add type operations are supported, where two operands are multiplied and a third operand is added to the full precision product, and then rounded with a single rounding error. For example, multiplication can be performed on two "normalized" operands. A normalized floating-point number is represented by a mantissa having a "1" value in the most significant bit (MSB) location and a format of 1.xxx - - - xx, where each "x" represents one bit that is either a one or a zero. As defined by the IEEE standard, the fractional portion "xxx - - - xx" represents 23 bits after the binary point for normalized single precision numbers and 52 bits for normalized double precision numbers. For a normalized number, the mantissa ranges from one to two (1.0≤mantissa<2.0). Multiplication of two normalized operands produces a resultant mantissa that ranges from one to four (1.0≤mantissa<4.0) and has a format of 01.xxx - - - xxxx or 1x.xxx - - - xxxx, where the fractional portion "xxx - - - xxxx" represents more than 23 bits (or 52 bits) for the unrounded multiplier result with single (or double) precision numbers. After optionally adding a properly aligned mantissa from a third operand, in the case of a fused multiply-add type instruction, post-processing is then performed on the result (i.e., the resultant mantissa), which includes, as necessary, normalization, rounding, and possible re-normalization. Floating-point multiplication is typically performed by a specially designed unit that implements a multiplication algorithm (such as the Booth or modified Booth algorithm).

Floating-point units have been constructed for performing arithmetic operations on single-precision floating-point data, double-precision floating-point data, or either single-precision floating-point data or double-precision floating-point data. Such floating-point units contain registers for storing floating-point data being processed, logic for processing the sign and exponent parts of floating-point data, mantissa arithmetic units for processing the mantissa, and logic for providing status signals to the processor controlling the floating-point unit.

In order to reduce costly circuit area, modern computing floating-point units need to handle data in scalar and vector mode. For example, one 64 bit double precision data path must be able to process two 32 bit single precision data in vector mode, or one 64 bit double precision data, with the same hardware, in scalar mode.

In the early processing steps of a floating-point unit (e.g., aligner, multiplier, and adder), it is possible to split the data path to guarantee the integrity of vector element data. In a floating-point unit normalizer, the amount of fraction bits is reduced, and the leading zeros of all vector data elements must be shifted out. Vector data elements are then brought close together before being rounded independently. Therefore, in the normalizer, a simple split of the shifter is not possible, since each part of the input must be shiftable over the complete width of the normalizer in scalar mode.

SUMMARY

Embodiments of the present invention disclose a method, computer program product, and computer system for supporting vector operations in a scalar data path. The method includes determining a location for a split in the scalar mode configuration to enable vector mode operations, wherein the split occurs between the last coarse shift multiplexer of the left half, controlled by the left control signal, and the first coarse shift multiplexer of the right half, controlled by the right control signal. The method includes determining the number of coarse shift multiplexers in conflict at a bit position receiving data from both the left half and the right half of the vector mode configuration, wherein Rf−1 coarse shift multiplexers equals the number of coarse shift multiplexers in conflict, where Rf is defined as the number of data inputs of the fine shift multiplexers. The method includes duplicating a coarse shift multiplexer in conflict at the bit position receiving data from both the left half and the right half of the vector mode configuration, resulting in one or more coarse shift multiplexers sharing the bit position, wherein a left coarse shift multiplexer at the bit position receives the left control signal and a right coarse shift multiplexer at the bit position receives the right control signal. The method includes duplicating an intermediate data signal in conflict at a signal position receiving data from both the left half and the right half of the vector mode configuration, resulting in two intermediate data signals sharing the signal position, wherein a left intermediate data signal receives data from the left coarse shift multiplexer receiving the left control signal, and a right intermediate data signal receives data from the right coarse shift multiplexer receiving the right control signal. The method includes receiving a control signal to split the scalar mode configuration and shift the leading zeros across the left half and the right half of the vector mode configuration, wherein the left half of the vector mode configuration receives the left control signal to independently control select signals left of the split, and the right half of the vector mode configuration receives the right control signal to independently control select signals right of the split.

DETAILED DESCRIPTION

Embodiments of the present invention provide the capability to enable a normalizer to work in vector and scalar mode, without data mix-up or data loss, by utilizing the duplication and connection of intermediate multiplexers.

Implementations of such embodiments may take a variety of forms, and exemplary implementation details are discussed subsequently with reference to the Figures.

As will be appreciated by one skilled in the art, aspects of the present invention may be embodied as a method or system. Accordingly, aspects of the present invention may take the form of an entirely hardware embodiment, or an embodiment combining software and hardware aspects that may all generally be referred to herein as a "circuit," "module," or "system."

Figure 1:
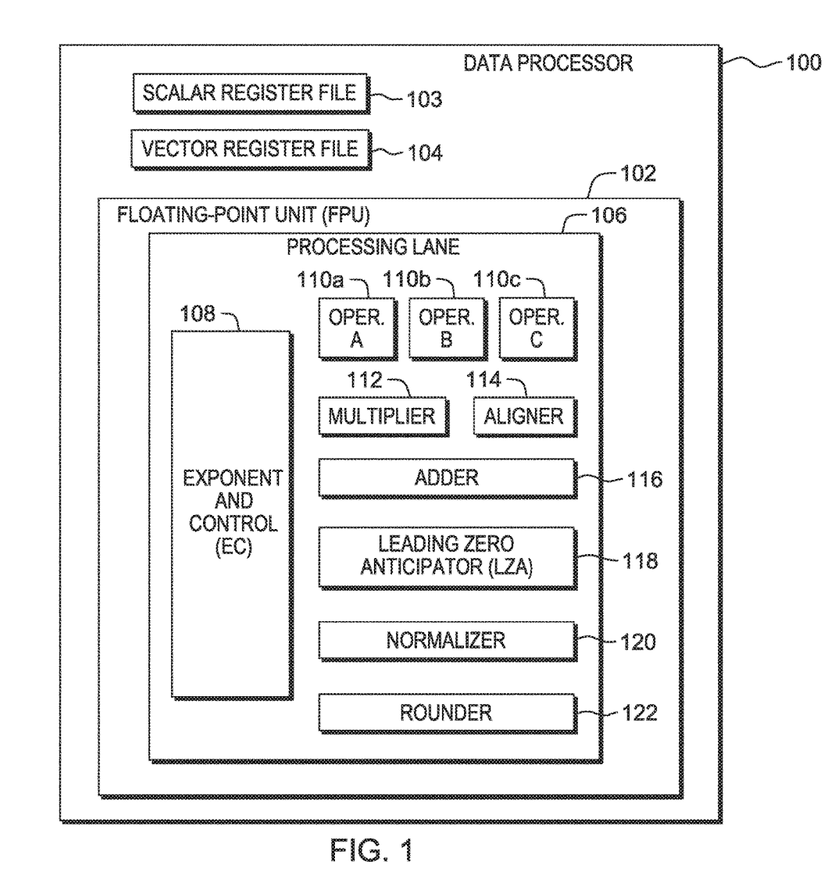
FIG. 1 is a block diagram of a data processor, in accordance with an embodiment of the present invention.

The present invention will now be described in detail with reference to Figures. FIG. 1 illustrates an exemplary data processor 100 incorporating a scalar register file (SR) 103, a vector register file (VR) 104, and a floating point unit (FPU) 102. SR 103 and VR 104 may be fully or partially integrated in a shared physical or logical register file structure, or separate physical or logical register file structures. Data processor 100 may be implemented in a plurality of processor architectures that issue and execute instructions, such as single or multi-core microprocessors or micro controllers.

In the exemplary embodiment, VR 104 stores a plurality of vectors operated on by FPU 102. For example, VR 104 may include vector data such as, vector coordinates, operand inputs and outputs, and the like. Data may be exchanged between VR 104 and memory, for example, cache memory using load and store instructions. Accordingly, VR 104 may be communicably coupled with a memory device, such as a dynamic random access memory (DRAM) device and/or a cache (SRAM) device. The results of an operation performed by FPU 102 may be written back to VR 104. For example, VR 104 may provide a write back path to write results computed by FPU 102 back to VR 104. Similarly, SR 103 stores a plurality of scalars operated on by FPU 102. FPU 102 may also be configured to operate on memory data directly.

In the exemplary embodiment, FPU 102 may be implemented as a vector/scalar floating point unit capable of 2×SP (single precision) operation, supporting both 1×64 bit double precision operation or 2×32 bit single precision operations. FPU 102 may be pipelined, including 7 cycles for executing a plurality of functions. FPU 102 may receive floating point instructions from an issue unit (not shown), which may be capable of issuing instructions from a plurality of threads. In another embodiment, FPU 102 may be configured to perform operations in processing lane 106 in parallel with one or more other processing lanes.

FPU 102 includes a processing lane 106. In the exemplary embodiment, processing lane 106 may be configured to process floating point instructions. In another embodiment, FPU 102 may include a plurality of processing lanes configured to perform an operation in parallel with one or more other processing lanes. For example, each processing lane may multiply a pair of operands to perform a cross product operation. By multiplying different pairs of operands in different processing lanes of FPU 102, vector operations may be performed faster and more efficiently.

In the exemplary embodiment, FPU 102 may be configured to perform both scalar and vector operations. FPU 102 may include a pipelined floating point architecture capable of operating on three vector operands 110, denoted A, B, and C.

In the exemplary embodiment, processing lane 106 includes an exponent and control (EC) 108, a multiplier 112, an aligner 114, an adder 116, a leading zero anticipator (LZA) 118, a normalizer 120, and a rounder 122. Processing lane 106 may be pipelined to further improve performance. Accordingly, processing lane 106 may include a plurality of pipeline stages for performing one or more operations on vector operands 110. For example, each vector lane may include multipler 112 for multiplying a pair of vector operands 110A and 110B. Vector operands 110A and 110B may be derived from one of the buses coupling SR 103 and VR 104 with FPU 102. In one embodiment, the multiplication of operands may be performed in a first stage of the pipeline, outputting two partial products that need to be added in a later pipeline stage.

Aligner 114 aligns a third operand to the product computed by multiplier 112, based on the exponent difference between the product and addend. While alignment is shown as a separate pipeline stage in FIG. 1, one skilled in the art will recognize that the multiplication and alignment may be performed in the same pipeline stage.

Adder 116 adds two or more multiplier partial products in processing lane 106. In the exemplary embodiment, LZA 118 predicts the leading bit position in parallel with the addition step so as to enable the normalization shift to be started as the addition completes. In the exemplary embodiment, adder 116 may also add the product to another vector operand 110C. Operand 110C, like operand 110A and 110B, may be derived from one of the buses connecting SR 103 and VR 104 to FPU 102. Therefore, processing lane 106 may be configured to perform a multiply-add instruction. One skilled in the art will recognize that multiply-add instructions are frequently performed in vector operations. Therefore, by performing several multiply-add operations in parallel lanes, the efficiency of vector processing may be significantly improved. In the exemplary embodiment, adder 116 sends input data fractions to normalizer 120 for processing.

In the exemplary embodiment, normalizer 120 functions as a two stage barrel shifter capable of shifting input bits to the left. Normalizer 120 presents a computed value in a convenient exponential format. For example, normalizer 120 may receive a value 0.0000063 as a result of an operation. Normalizer 120 may convert the value into a more suitable exponential format, such as, 6.3×10 to the negative $6^{th}$ power. In the exemplary embodiment, rounder 122 rounds a computed value to a desired number of decimal points. For example, a computed value of 10.5682349 may be rounded to 10.568 if only three decimal places are desired in the result. In another embodiment, rounder 122 may round the least significant bits of the particular precision floating-point number that rounder 122 is designed to work with.

One skilled in the art will recognize that embodiments of the invention are not limited to the particular pipeline stages, components, and arrangement of components described above and in FIG. 1. Furthermore, embodiments of the present invention are not limited to the particular components described in FIG. 1. Any combination of the described components and additional components may be included in each processing lane.

In another embodiment, one or more floating-point units may be coupled with a vector register file. For example, two floating-point units may be coupled to one vector register file. Each floating-point unit may be configured to independently and simultaneously process vector and scalar instructions. In another embodiment, one or more resources in a first floating-point unit may be shared with a second floating-point unit to process an instruction, for example, a cross product instruction.

Figure 2:
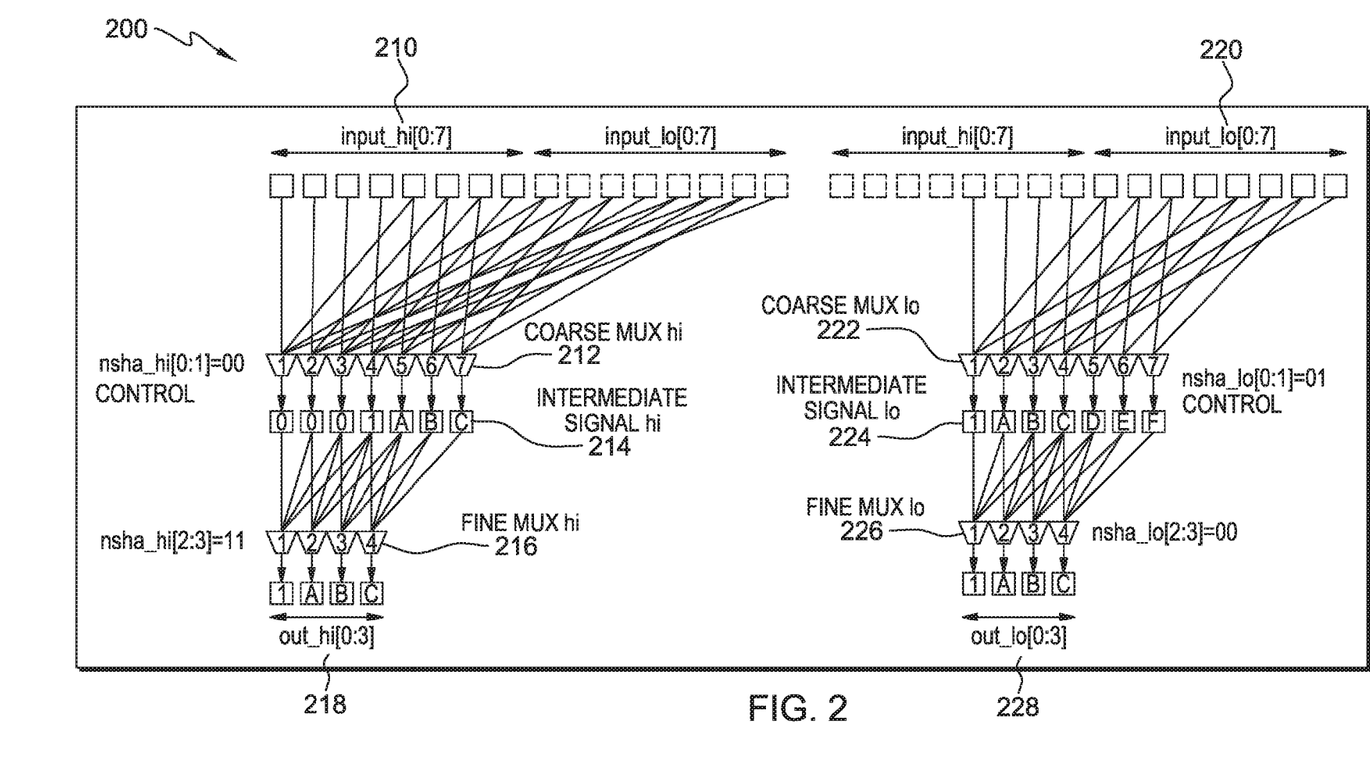
FIG. 2 is an exemplary illustration of a normalizer circuit for supporting vector operations in a scalar floating-point unit, in accordance with an embodiment of the present invention.

FIG. 2 illustrates in greater detail a configuration diagram, 200, of an exemplary embodiment of normalizer 120 of FIG. 1. In the exemplary embodiment, normalizer 120 may be configured with a 16 bit input string width and an 8 bit output string width. In another embodiment, normalizer 120 may be configured for a typical floating-point application, structured as a shifter with a 110 bit input string width and a 54 bit output string width. In the exemplary embodiment, normalizer 120 operates within a scalar floating-point unit capable of executing vector instructions. In scalar mode, normalizer 120 performs one wide bit shift. In vector mode, normalizer 120 performs two small bit shifts. FIG. 2 depicts the two small bit shifts of the vector mode operation of normalizer 120 through two separate "small normalizers." However, in practice, the two small bit shifts in the vector mode operation happen simultaneously, and occur on the same structure of normalizer 120.

In the exemplary embodiment, normalizer 120 operates as a two level shifter including a first level coarse shift, followed by a second level fine shift. In the first level coarse shift, the coarse shift amounts are performed to reduce the bit width of the data flow. For example, the first level coarse shift may shift out groups of 8 leading zero bits. Therefore, if the input contains 25 leading zero bits, the first level coarse shift stage may shift out 3×8 bits, equal to 24 bits. In the second level fine shift, the fine shift amounts are performed to remove any remaining leading zero bits. With reference to the example above, where 24 of 25 leading zero bits were shifted out in the first level coarse shift, the second level fine shift may shift out 1×1 bits, shifting out the last remaining leading zero bit. In another embodiment, normalizer 120 may operate with three or more levels of shifting. For example, normalizer 120 may have two levels of coarse shifts, followed by two levels of fine shifts, and an extra shift, as may be necessary with an inexact leading zero anticipator.

In the exemplary embodiment, normalizer 120 receives a signal to "split" a scalar mode configuration (including, for example, a 16 bit input string width, 11 coarse shift multiplexers, 11 intermediate data signals, 8 fine shift multiplexers, and an 8 bit output string width) into a vector mode configuration, characterized by a left half and a right half. In the exemplary embodiment, splitting occurs at the control level, not on the hardware itself. For example, the vector mode configuration receives two independent control signals from, for example, EC 108 or LZA 118; a normalization shift amount hi (NSHA hi) to control the left half of the vector mode configuration, and a normalization shift amount lo (NSHA lo) to control the right half of the vector mode configuration. More specifically, instead of receiving a singular, coupled control across select signals, the scalar mode configuration now receives NSHA hi to independently control select signals left of the split, and receives NSHA lo to independently control select signals right of the split. Initiating the split in scalar mode configuration occurs only when vector mode operations are desired. In the exemplary embodiment, issuance of the signal to split and the signals to shift (NSHA hi and NSHA lo) occur simultaneously. Normalizer 120 may explicitly receive a signal to split into vector mode configuration, or normalizer 120 may implicitly receive the signal to split into vector mode configuration by receiving independent NSHA hi and NSHA lo signals.

In the exemplary embodiment, location of the split in the scalar mode configuration to enable vector mode operations may be determined through a formulaic relationship between the output string width, the number of fine shift multiplexers, the number of inputs per fine shift multiplexer, and the number of coarse shift multiplexers. For example, if the output string width may be defined as "O" bits, the number of multiplexers needed in the fine shift stage may be defined as "O," the number of inputs for a multiplexer in the fine shift stage may be defined as "Rf," and the number of multiplexers in the coarse shift state may be defined as "O+Rf−1," then an output string width of 4 bits, along with 4 fine shift stage multiplexers, assigned 4 inputs each, necessitates 7 coarse shift stage multiplexers. In the aforementioned scalar mode configuration example, it follows that splitting the output string width of 8 bits into a left half and a right half, each with an output string width of 4 bits, requires both the left half and right half in the vector mode configuration to include 7 coarse shift multiplexers, respectively. Therefore, the split occurs between the last coarse shift multiplexer of the left half, controlled by NSHA hi, and the first coarse shift multiplexer of the right half, controlled by NSHA lo.

The left half of the vector mode configuration includes an input hi 210 (with an 8 bit input string width, derived from the first half of the scalar mode configuration 16 bit input string), a coarse MUX hi 212, which includes the first seven multiplexers of the scalar mode configuration (from left to right, 1-7), an intermediate signal hi 214, which includes the first seven intermediate data signals of the scalar mode configuration (from left to right, 1-7), a fine MUX hi 216, which includes the first four multiplexers of the scalar mode configuration (from left to right, 1-4), and an output hi 218 (with a 4 bit output string width, derived from the first half of the scalar mode configuration 8 bit output string).

The right half of the vector mode configuration includes an input lo 220 (with an 8 bit input string width, derived from the last half of the scalar mode configuration 16 bit input string), a coarse MUX lo 222, which includes the last seven multiplexers of the scalar mode configuration (from right to left, 7-1), an intermediate signal lo 224, which includes the last seven intermediate data signals of the scalar mode configuration (from right to left, 7-1), a fine MUX lo 226, which includes the last four multiplexers of the scalar mode configuration (from right to left, 4-1), and an output lo 228 (with a 4 bit output string width, derived from the last half of the scalar mode configuration 8 bit output string).

Figure 3:
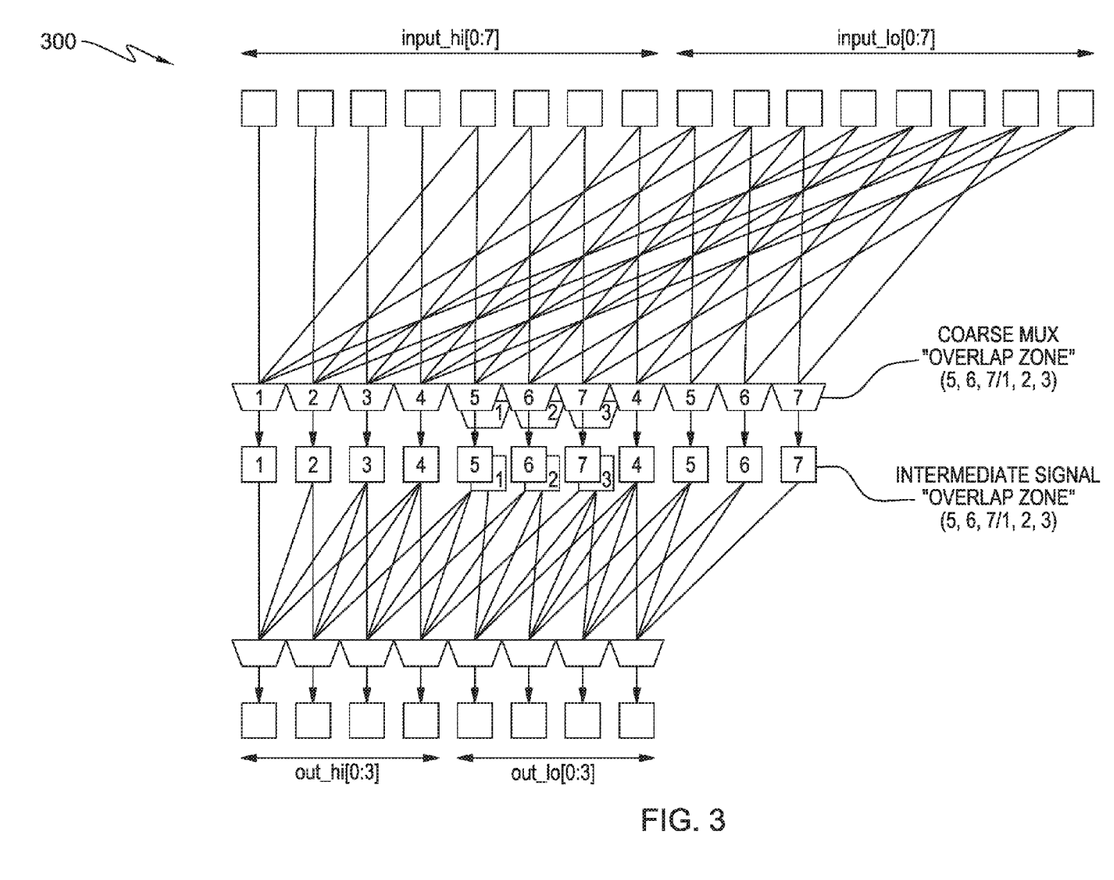
FIG. 3 is an alternative view of FIG. 2, illustrating the left and right halves of the vector mode configuration superimposed, in accordance with an embodiment of the present invention.

FIG. 3 depicts a configuration diagram, 300, of an embodiment of normalizer 120 of FIG. 1, illustrating the left and right halves of the vector mode configuration overlaid, evincing a coarse shift multiplexer "overlap zone," and an intermediate data signal "overlap zone."

In the exemplary embodiment, the coarse MUX overlap zone contains two coarse multiplexers, one coarse MUX hi 212 multiplexer and one coarse MUX lo 222 multiplexer, occupying the same bit position. For example, multiplexers 5, 6, and 7 of coarse MUX hi 212 occupy the same bit positions as multiplexers 1, 2, and 3 of coarse MUX lo 222, respectively. The number of coarse multiplexers overlapping may be represented as "Rf−1." Therefore, in the aforementioned example, if the number of data inputs of the fine shift multiplexers equals 4, then the number of overlapping coarse multiplexers equals 3.

In the exemplary embodiment, the intermediate data signal overlap zone contains two intermediate data signals, one intermediate signal hi 214 data signal and one intermediate signal lo 224 data signal occupying the same signal position. For example, data signals 5, 6, and 7 of intermediate signal 214 occupy the same signal position as data signals 1, 2, and 3 of intermediate signal 224, respectively.

In the exemplary embodiment, duplication of overlapping coarse shift multiplexers avoids data mix-up in the overlap zone. As noted above, overlapping coarse shift multiplexers may be defined as Rf−1. Therefore, duplication of Rf −1 additional coarse shift multiplexers resolves overlapping issues. In the aforementioned example, if the number of data inputs of the fine shift multiplexers equals 4, then 3 coarse shift multiplexers invariably overlap. Duplication of 3 coarse shift multiplexers, at bit positions with overlapping, distributes 6 coarse shift multiplexers over the 3 bit positions with overlapping (2 coarse shift multiplexers at each bit position with overlapping). Of the 2 coarse shift multiplexers at each bit position, the first coarse shift multiplexer receives NSHA hi, and the second coarse shift multiplexer receives NSHA lo. Duplication enables the left half of the vector mode configuration to retain the necessary 7 coarse shift multiplexers of coarse MUX hi 212, and enables the right half of the vector mode configuration to retain the 7 coarse shift multiplexers of coarse MUX lo 222. For example, coarse MUX hi 212 multiplexers 5, 6, and 7 no longer overlap with coarse MUX lo 222 multiplexers 1, 2, and 3. Although receiving independent control signals, coarse MUX hi 212 multiplexers and coarse MUX lo 222 multiplexers receive the same input data.

In the exemplary embodiment, duplicating overlapping coarse shift multiplexers to extend support for scalar operations processing two vector normalizations raises the total number of coarse shift multiplexers in the scalar mode configuration from 11 coarse shift multiplexers to 14 coarse shift multiplexers.

In the exemplary embodiment, duplication of overlapping coarse shift multiplexers requires a similar duplication of the intermediate data signals to avoid data mix-up in the overlap zone. For example, intermediate data signals that receive data from both coarse MUX hi multiplexers and coarse MUX lo multiplexers may be duplicated to split the data. Intermediate signal hi 214 data signals may receive data from coarse MUX hi 212 multiplexers, and intermediate signal lo 224 data signals may receive data from coarse MUX lo 222 multiplexers. In another example, data may be split into output hi data and output lo data, with intermediate signal hi 214 data signals receiving output hi data and intermediate signal lo 224 data signals receiving output lo data.

Figure 4:
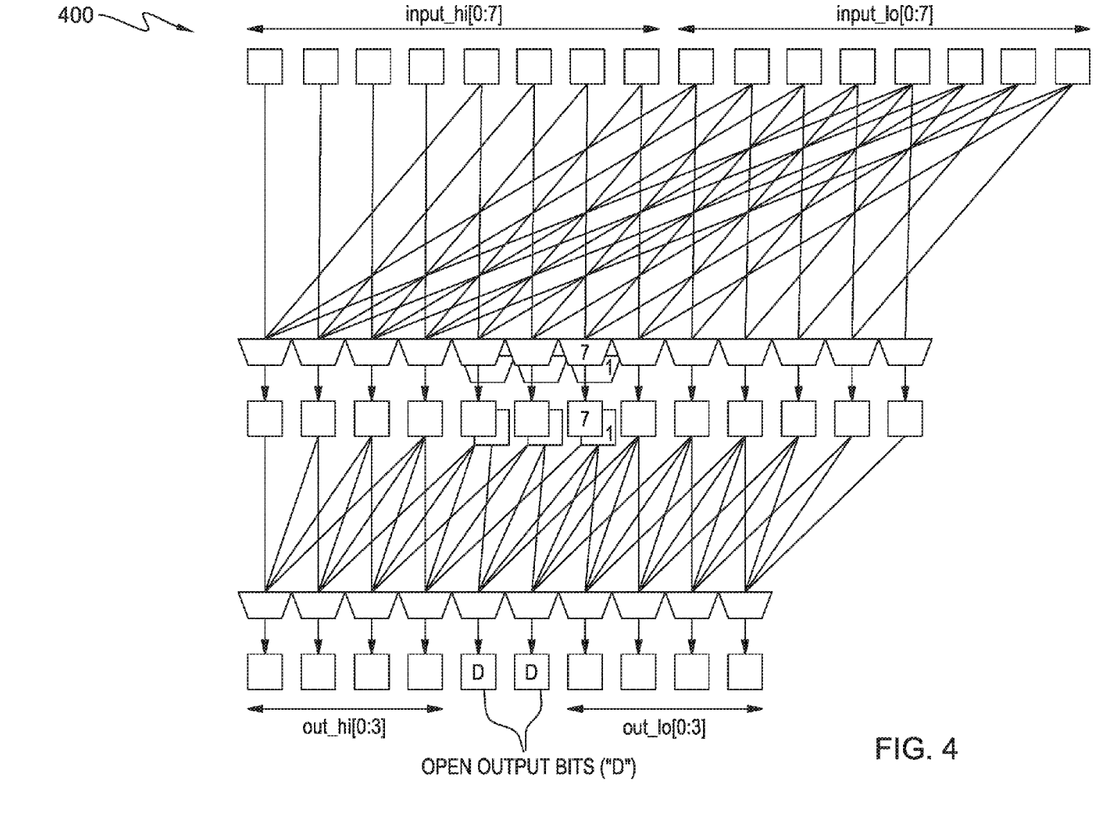
FIG. 4 is an alternative view of FIG. 3, illustrating the potential economy of the normalizer circuit, in accordance with an embodiment of the present invention.

FIG. 4 depicts a configuration diagram, 400, of an embodiment of normalizer 120 of FIG. 1, illustrating potential economy in the normalizer. In the exemplary embodiment, the cost of extending support of scalar operation (e.g., the number of coarse shift multiplexers needed to be duplicated) to cover two vector operations may be lower where the total output string width of the two vector operations, defined by "O vector" bits, is less than the total output string width of the singular scalar operation, defined by "O scalar" bits. For example, in scalar mode operations, both duplicated coarse shift multiplexers, such as coarse MUX hi 212 multiplexer 5 and coarse MUX lo 222 multiplexer 1, select the same input. In vector mode operations, both duplicated coarse shift multiplexers may not select the same input, thereby leaving open output bits, defined as "D" bits, between the left half output hi 218 and the right half output lo 228. In floating-point fraction normalization, two low precision mantissas are typically less wide than one higher precision mantissa. The number of potential "D" bits may be represented as "D=O scalar−O vector." The economy of the "D" bits is realized in the reduced number of additional coarse shift multiplexers to be duplicated, resulting in an even lower circuit area cost. As previously stated, the number of coarse shift multiplexers to be duplicated may be expressed as "Rf−1." If one "D" bit between, for instance, output hi 218 and output lo 228 eliminates one corresponding coarse shift multiplexer, then the number of coarse shift multiplexers to be duplicated may now be expressed as "Rf−1−D." For example, if the number of inputs of the fine shift multiplexers, "Rf," equals 4, and the distance between output hi 218 and output lo 228, "D" bits, equals 2, then the number of coarse shift multiplexers to be duplicated equals 1. Utilizing the two "D" bits reduces the number of additional coarse shift multiplexers from three to one.

Figure 5:
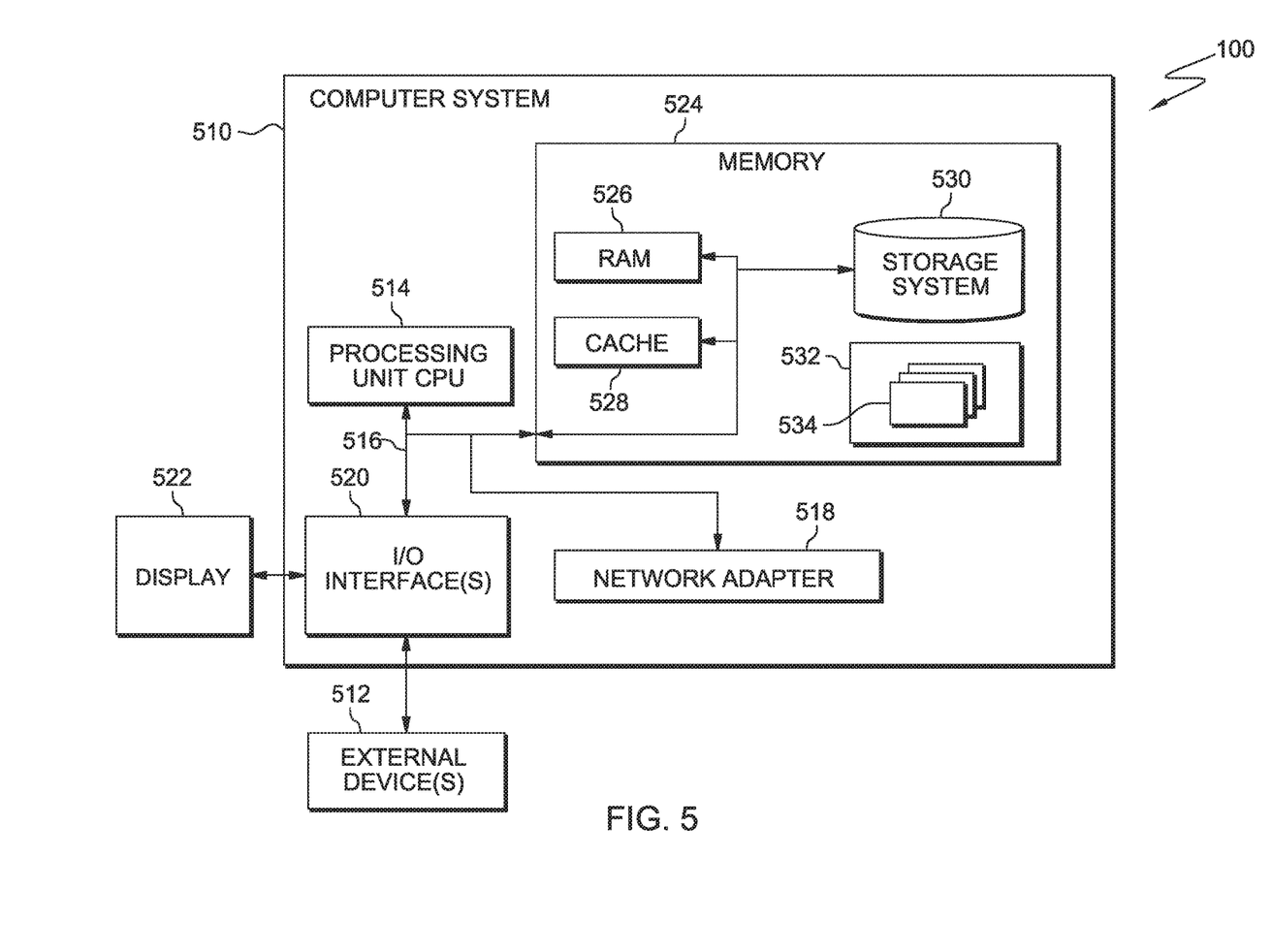
FIG. 5 is a block diagram of components of a data processing system, depicted in accordance with the present invention.

FIG. 5 depicts a block diagram of components of data processing system 100, in accordance with an illustrative embodiment of the present invention. It should be appreciated that FIG. 5 provides only an illustration of one implementation and does not imply any limitations with regard to the environments in that different embodiments may be implemented. Many modifications to the depicted environment may be made.

Computer system 510 in data processing system 100 is shown in the form of a general-purpose computing device. The components of computer system 510 may include, but are not limited to, one or more processors or processing units 514, a system memory 524, and a bus 516 that couples various system components including system memory 524 to processor 514.

Bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 510 typically includes a variety of computer system readable media. Such media may be any available media that is accessible by computer system 510, and it includes both volatile and non-volatile media, removable and non-removable media.

System memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 516 by one or more data media interfaces. As will be further depicted and described below, system memory 524 may include at least one computer program product having a set (e.g., at least one) of program modules that are configured to carry out the functions of embodiments of the invention.

Program/utility 532, having one or more sets of program modules 534, may be stored in memory 524 by way of example, and not limitation, as well as an operating system, one or more application programs, other program modules, and program data. Each of the operating systems, one or more application programs, other program modules, and program data, or some combination thereof, may include an implementation of a networking environment. Program modules 534 generally carry out the functions and/or methodologies of embodiments of the invention as described herein. Computer system 510 may also communicate with one or more external devices 512 such as a keyboard, a pointing device, a display 522, etc. one or more devices that enable a user to interact with computer system 510 and any devices (e.g., network card, modem, etc.) that enable computer system 510 to communicate with one or more other computing devices. Such communication can occur via Input/Output (I/O) interfaces 520. Still yet, computer system 510 can communicate with one or more networks such as a local area network (LAN), a general wide area network (WAN), and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives, and data archival storage systems may be used in conjunction with computer system 510.

The flowcharts and block diagrams in the figures illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for supporting vector operations in a scalar data path, the computer program product comprising:

one or more computer readable storage devices, wherein the one or more computer readable storage devices are hardware, and program instructions stored on the one or more computer readable storage devices, the program instructions comprising:

program instructions to determine a location for splitting a scalar mode configuration into a left half and a right half of a vector mode configuration through a formulaic relationship between an output string width, a number of fine shift multiplexers, a number of inputs per fine shift multiplexer, and a number of coarse shift multiplexers of a normalizer circuit, wherein the location for a split occurs between a last coarse shift multiplexer of the left half, controlled by a left control signal, and a first coarse shift multiplexer of the right half, controlled by a right control signal; program instructions to determine the number of coarse shift multiplexers in conflict at a bit position receiving data from both the left half and the right half of the vector mode configuration, wherein Rf−1 coarse shift multiplexers equals the number of coarse shift multiplexers in conflict, where Rf is defined as the number of data inputs of the fine shift multiplexers;

program instructions to duplicate a coarse shift multiplexer in conflict at the bit position receiving data from both the left half and the right half of the vector mode configuration, resulting in one or more coarse shift multiplexers sharing the bit position, wherein a left coarse shift multiplexer at the bit position receives the left control signal and a right coarse shift multiplexer at the bit position receives the right control signal;

program instructions to duplicate an intermediate data signal in conflict at a signal position receiving data from both the left half and the right half of the vector mode configuration, resulting in two intermediate data signals sharing the signal position, wherein a left intermediate data signal receives data from the left coarse shift multiplexer receiving the left control signal, and a right intermediate data signal receives data from the right coarse shift multiplexer receiving the right control signal; and program instructions to receive a control signal to split the scalar mode configuration and shift the leading zeros across the left half and the right half of the vector mode configuration, wherein the left half of the vector mode configuration receives the left control signal to independently control select signals left of the split, and the right half of the vector mode configuration receives the right control signal to independently control select signals right of the split.

2. The computer program product of claim 1, wherein determining the location for splitting a scalar mode configuration into a left half and a right half of a vector mode configuration through a formulaic relationship, further comprise program instructions to determine the number coarse shift multiplexers assigned to the left half of the vector mode configuration, equal to "O+Rf−1," and the number of coarse shift multiplexers assigned to the right half of the vector mode configuration, equal to "O+Rf−1," where O is defined as the output width of the respective vector half.

3. The computer program product of claim 1, wherein program instructions to duplicate the coarse shift multiplexer in conflict at the bit position receiving data from both the left half and the right half of the vector mode configuration, further comprise program instructions to duplicate fewer coarse shift multiplexers in conflict, equal to "Rf−1−D", when open output bits, defined as "D" bits, exist between an output of the left half and an output of the right half in the vector mode configuration.

4. The computer program product of claim 3, wherein program instructions to duplicate fewer coarse shift multiplexers in conflict, further comprise program instructions to determine the number of open output bits, wherein open output bits equal the total output string width of the singular scalar mode configuration minus the total output string width of both the left half and right half of the vector mode configuration.

5. A computer system for supporting vector operations in a scalar data path, the computer system comprising:

one or more computer readable storage media;

program instructions stored on at least one of the one or more computer readable storage media for execution by at least one of the one or more computer processors, the program instructions comprising:

program instructions to determine a location for splitting a scalar mode configuration into a left half and a right half of a vector mode configuration through a formulaic relationship between an output string width, a number of fine shift multiplexers, a number of inputs per fine shift multiplexer, and a number of coarse shift multiplexers of a normalizer circuit, wherein the location for a split occurs between a last coarse shift multiplexer of the left half, controlled by a left control signal, and a first coarse shift multiplexer of the right half, controlled by a right control signal;

program instructions to determine the number of coarse shift multiplexers in conflict at a bit position receiving data from both the left half and the right half of the vector mode configuration, wherein Rf−1 coarse shift multiplexers equals the number of coarse shift multiplexers in conflict, where Rf is defined as the number of data inputs of the fine shift multiplexers;

program instructions to duplicate a coarse shift multiplexer in conflict at the bit position receiving data from both the left half and the right half of the vector mode configuration, resulting in one or more coarse shift multiplexers sharing the bit position, wherein a left coarse shift multiplexer at the bit position receives the left control signal and a right coarse shift multiplexer at the bit position receives the right control signal;

program instructions to duplicate an intermediate data signal in conflict at a signal position receiving data from both the left half and the right half of the vector mode configuration, resulting in two intermediate data signals sharing the signal position, wherein a left intermediate data signal receives data from the left coarse shift multiplexer receiving the left control signal, and a right intermediate data signal receives data from the right coarse shift multiplexer receiving the right control signal; and program instructions to receive a control signal to split the scalar mode configuration and shift the leading zeros across the left half and the right half of the vector mode configuration, wherein the left half of the vector mode configuration receives the left control signal to independently control select signals left of the split, and the right half of the vector mode configuration receives the right control signal to independently control select signals right of the split.

6. The computer system of claim 5, wherein determining the location for splitting a scalar mode configuration into a left half and a right half of a vector mode configuration through a formulaic relationship, further comprise program instructions to determine the number coarse shift multiplexers assigned to the left half of the vector mode configuration, equal to "O+Rf−1," and the number of coarse shift multiplexers assigned to the right half of the vector mode configuration, equal to "O+Rf−1," where O is defined as the output width of the respective vector half.

7. The computer system of claim 5, wherein program instructions to duplicate the coarse shift multiplexer in conflict at the bit position receiving data from both the left half and the right half of the vector mode configuration, further comprise program instructions to duplicate fewer coarse shift multiplexers in conflict, equal to "Rf−1−D", when open output bits, defined as "D" bits, exist between an output of the left half and an output of the right half in the vector mode configuration.

8. The computer system of claim 7, wherein program instructions to duplicate fewer coarse shift multiplexers in conflict, further comprise program instructions to determine the number of open output bits, wherein open output bits equal the total output string width of the singular scalar mode configuration minus the total output string width of both the left half and right half of the vector mode configuration.

* * * * *